United States Patent [19]

Hutter

[11] Patent Number: 5,498,661

[45] Date of Patent: Mar. 12, 1996

[54] BINDER FOR CHEMICAL-RESISTANT INKS

[75] Inventor: G. Frederick Hutter, Charleston, S.C.

[73] Assignee: Westvaco Corporation, New York, N.Y.

[21] Appl. No.: 437,626

[22] Filed: May 9, 1995

Related U.S. Application Data

[63] Continuation-in-part of Ser. No. 299,161, Aug. 29, 1994, abandoned.

[51] Int. Cl.⁶ ..................................................... C08K 5/15
[52] U.S. Cl. ........................... 524/753; 524/751; 524/100; 524/253
[58] Field of Search ..................................... 524/100, 253, 524/753, 751

[56] References Cited

U.S. PATENT DOCUMENTS

| | | | |
|---|---|---|---|
| 5,100,969 | 3/1992 | Yamamoto et al. | 525/327.3 |
| 5,147,706 | 9/1992 | Kingman | 428/195 |
| 5,183,847 | 2/1993 | El-Hefnawi et al. | 525/54.44 |
| 5,296,530 | 3/1994 | Bors et al. | 524/558 |
| 5,326,674 | 7/1994 | Toyama et al. | 430/325 |

Primary Examiner—Peter D. Mulcahy
Attorney, Agent, or Firm—Daniel B. Reece, IV; Terry P. McDaniel; Richard L. Schmalz

[57] ABSTRACT

The invention relates to ink binders. In particular, the invention relates to acrylic latex binders for use in preparing zinc-containing water-based inks for printing on plastic films. Inks containing these binders exhibit increased chemical resistance to commonly-used cleaning formulations and excellent heat resistance and water-crinkle resistance properties.

4 Claims, No Drawings

BINDER FOR CHEMICAL-RESISTANT INKS

This application is a continuation-in-part of the commonly assigned, U.S. patent application Ser. No. 07/299,161 filed Aug. 29, 1994, entitled "Chemical-Resistant Acrylic Latex Formulations", now abandoned.

FIELD OF THE INVENTION

The invention relates to ink binders. In particular, the invention relates to acrylic latex binder compositions for use in preparing zinc-containing water-based inks for printing on plastic films. Inks containing these binders exhibit increased chemical resistance to commonly-used cleaning formulations and excellent heat resistance and water-crinkle resistance properties.

BACKGROUND OF THE INVENTION

A growing area in the field of printing is known as flexography or flexographic ink printing. Flexographic ink printing is a branch of rotary typographic printing in which the printing is applied to a print-receiving substrate by use of a flexible relief plate with highly fluid, volatile inks which dry rapidly by evaporation. Flexography is widely utilized for printing on plastic films.

Another process which is widely utilized for printing on plastic films is the gravure process. In this process the printing image is engraved into a cylinder in the form of cells which become filled with ink. Printing is achieved by passing the substrate between the gravure cylinder and an impression roller under pressure.

A flexographic or gravure printing ink generally contains three basic types of ingredients denominated as a solvent, a colorant, and a binder. Minor amounts of other additives also may be employed to provide the desired characteristics (i.e., rheology, viscosity, etc.) for the printing ink composition.

In recent years, increased emphasis has been placed on the use of water as the solvent, rather than an organic solvent. In keeping with this trend, a wide variety of colorants or pigments have been developed for use in water-based ink formulations.

The binder component of the printing ink composition generally comprises a resin which functions primarily to increase adhesion of the pigment to the substrate, while also often acting as a dispersing medium and carrier. Specific acrylic polymer latexes are commonly employed as binders in water-based printing ink compositions.

However, one of the major shortcomings of using water-based inks (relative to the traditional solvent-based alternatives) for printing on plastic film is a lack of chemical resistance. That is, certain chemicals tend to cause water-based inks to loose their adherence to plastic films, thereby making the ink smear or run. Thus, good chemical resistance is a highly desired characteristic because of the environments to which many printed packages are exposed.

Therefore, it is the object of this invention to produce acrylic latex binders for use in preparing zinc-containing water-based printing inks which, when utilized for printing on plastic films, exhibit increased chemical resistance.

A further object of this invention is to produce chemical resistant aqueous printing inks.

SUMMARY OF THE INVENTION

The objects of this invention are met by copolymerizing (in the presence of a water-soluble acrylic support resin and a sulfonated polystyrene surfactant) an epoxy-containing monomer, a styrene-type monomer and/or a non-functional (meth)acrylate, and acetoacetoxyethyl methacrylate. A polyamine is post-added to crosslink the epoxy groups of the epoxy-containing monomer, thereby producing the desired binder composition for use in formulating the chemical-resistant aqueous ink. Thus, the key to the desired functionality of these binders lies in the incorporation of two types of functional groups into the binder compositions (epoxy groups and β-dicarbonyl groups) together with a polyamine added to the external phase of the binder formulation.

Zinc-containing water-based printing inks prepared with these acrylic latex binders exhibit superior chemical resistance to glycol ethers (which are commonly employed in commercial cleaning formulations). In addition, these inks exhibit both excellent heat resistance and water-crinkle resistance on films (such as polypropylene, polyester, and the like).

The invention is directed to novel binder compositions and the process for making the same. In addition, the invention is also directed to zinc-containing water-based inks containing these novel binder compositions.

DESCRIPTION OF THE PREFERRED EMBODIMENT

The binder composition which imparts chemical-resistance to aqueous inks is produced by reacting in an addition emulsion polymerization reaction:

(a) 100.0 parts by total weight of the binder composition of a monomer mixture comprising:

(1) 2.0 to 10.0% by total weight of the monomer mixture of an epoxy-containing monomer, (2) 2.0 to 10.0% by total weight of the monomer mixture of acetoacetoxyethyl methacrylate, and (3) 80.0 to 96.0% by total weight of the monomer mixture of a member selected from the group consisting of styrene, α-methylstyrene, alkyl acrylates wherein the alkyl group contains from 1 to 18 carbon atoms, methacrylates wherein the alkyl group contains from 1 to 18 carbon atoms, and combinations thereof;

(b) 10.0 to 30.0 parts by total weight of the binder composition of a water-soluble acrylic support resin having a number average molecular weight of about 3,000 to about 10,000 and an acid number of about 160 to about 240; and (c) 0.5 to 4.0 parts by total weight of the binder composition of a sulfonated polystyrene salt of the structure

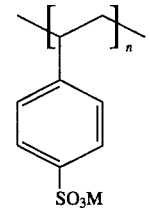

where M is a member selected from the group consisting of monovalent metal ions, ammonium ions, and substituted ammonium ions, to produce a latex; then add to the latex (d) 0.5 to 5.0 parts by total weight of the binder composition of an amine selected from the group consisting of amines containing at least 1 primary amine group and at least 1 secondary amine group, amines containing at least 2 primary amine groups, amines containing at least 2 secondary amine groups, and combinations thereof; thereby crosslinking the epoxy groups of the epoxy-containing monomer to produce said binder composition.

Epoxy-containing monomers which are suitable for use in producing the binder compositions include, but are not limited to, the following:
  glycidyl acrylate,
  glycidyl methacrylate, and
  combinations thereof.

Sulfonated polystyrene surfactants which are suitable for use in producing the binder compositions are salts having the chemical structure:

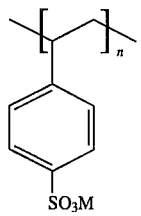

where M is a member selected from the group consisting of monovalent metal ions, ammonium ions, and substituted ammonium ions.

Suitable commercially available surfactants include VERSA TL-70 and VERSA TL-502 (manufactured by Alco Chemical, a subsidiary of National Starch, Inc.).

The pH at which the binders are prepared may effect their stability. The preferred pH range for use in the addition polymerization reaction is from about 7.0 to 11.0, with the most preferred range being 8.0 to 9.5.

Amines which are suitable to be added to the latex to produce the desired binders include, but are not limited to, the following:
  aminoethylpiperazine,
  piperazine, and
  combinations thereof.

As noted above, zinc-containing water-based inks prepared with these binder compositions exhibit highly desired characteristics. Commercially available zinc-crosslinkers which are suitable for use in formulating these inks include, but are not limited to, the following: JONREZ A-2361 (manufactured by the Westvaco Corporation), ZINPLEX 15 (manufactured by Ultra Additives, Inc.), and combinations thereof.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A chemical-resistant binder composition was produced via the following procedure. Into a 1000 ml three-neck round bottom flask was charged 69.0 g (23.00 parts) of MOREZ-101 (an acrylic support resin commercially available from Morton International), 300 g of deionized (DI) water, and 16.0 g of NH$_4$OH (to give the mixture a pH of about 8.5). Subsequently, about 5.28 g (1.76 parts) of VERSA TL-70 (a sulfonated polystyrene surfactant commercially available from Alco Chemical, a subsidiary of National Starch, Inc.) was added to the mixture. The mixture was heated to a temperature of 85° C. over a period of 45 minutes; and this temperature was maintained throughout the reaction.

While the first mixture was heating, a 1000 ml beaker was charged with 58.8 g (19.60 parts) of styrene, 112.8 g (37.60 parts) of butyl acrylate, 97.8 g (32.60 parts) of 2-ethylhexyl acrylate, 15.0 g (5.00 parts) of acetoacetoxyethyl methacrylate, and 15.0 g (5.00 parts) of glycidyl methacrylate to form a monomer blend.

When the mixture in the flask reached a temperature of 85° C., 10% of the monomer blend was charged into the flask. Simultaneously, a mixture of 1.3 g (0.43 parts) of ammonium persulfate (as an initiator) and 4.0 g (1.30 parts) of DI water was also charged into the flask, and the resulting mixture was stirred and allowed to react for a period of about 20 minutes. After this period the remainder of the monomer blend was pumped into the flask over a 2 hour interval. Concurrently, second charge of 1.3 g (0.43 parts) of ammonium persulfate and 4.0 g (1.30 parts) of DI water was also added to the flask after the 20 minute period. A third charge of 1.3 g (0.43 parts) of ammonium persulfate and 4.0 g (1.30 parts) of DI water was added to the flask about 90 minutes after the addition of the second charge. After an additional two hours, the latex mixture was allowed to cool and was filtered. Subsequently, the latex mixture was diluted with 278.92 g of DI water to achieve a solids level of about 40%.

To a clean 1000 ml beaker was charged 550.00 g of the latex mixture and 3.65 g of aminoethylpiperazine. The resulting mixture was allowed to react with stirring to produce the desired acrylic latex binder (hereafter referred to as Binder #1).

A series of acrylic latex binders were produced for evaluation purposes. The binders were made via the procedure taught above for producing Binder #1 except that the formulations were varied. For example, in Binder #2 the sulfonated polystyrene surfactant contained in Binder #1 was replaced with conventional surfactants—2.64 g of IGEPAL CA-897 (a surfactant commercially available from Rhone-Poulenc, Inc) and 2.64 g of ABEX EP-120 (a surfactant commercially available from Rhone-Poulenc, Inc). In Binder #3, no surfactant was utilized, and the amount of acrylic support resin (MOREZ-101) was increased from 23 to 28 parts. In Binder #4, the epoxy-containing monomer (glycidyl methacrylate) was eliminated. In Binder #5, the acetoacetoxyethyl methacrylate was eliminated. The properties of the different binders are listed in Table I below.

TABLE I

| PROPERTIES OF INK BINDER FORMULATIONS | | | | | |
|---|---|---|---|---|---|
| Binder No. | % Solids | pH | Viscosity cP | *$T_g$ °C. | Particle size. nm |
| 1 | 38.2 | 9.2 | 6300 | −16 | 115 |
| 2 | 39.4 | 9.0 | 3860 | −10 | 79 |
| 3 | 39.2 | 9.2 | 245 | −16 | 44 |
| 4 | 46.6 | 8.3 | 418 | −26 | 38 |
| 5 | 43.8 | 9.4 | 5600 | −37 | 46 |

*$T_g$ = Glass transition temperature in °C.

Each binder was subsequently diluted (via the addition of DI water) to about a 40% solids level and used to produce an ink following the formula and procedure listed below:

45 g of FLEXIVERSE phthalo blue base (commercially available from Sun Chemicals, Inc.), 44 g of ink binder, 2 g of ZINPLEX 15 (a zinc-crosslinker commercially available from Ultra Additives, Inc.), 1 g of TK88-3021 (a silicone-slip agent commercially available from Sun Chemicals, Inc.), 2 g of EKTASOLVE EP (a glycol ether coalescing agent commercially available from Eastman Chemicals, Inc.), and 6 g of DI water (although the amount of water may be varied to obtain the desired viscosity of 25 seconds in a #2 Zahn cup).

In making the inks, the FLEXIVERSE base was first weighed into a tall eight-ounce jar. Vigorous stirring was initiated with the stirrer being a steel shaft holding a three-bladed propeller having a diameter of about 1.5 inches. The other ingredients were then added in the order listed above.

Prints were made on 48 LBT polyester film with a flexo hand proofer using a 200-line anilox roll. For backing, the film was laid on a piece of hard rubber printing blanket. Prints were dried for five seconds at 80° C. Overdried samples were also made by drying for two minutes at the same temperature.

Resistance of the dried prints to FORMULA 409 (a commercial cleaning formulation containing 2-butoxyethanol available from Clorox, Inc.) was checked by placing a small drop of the chemical on the print surface and wiping it off with a KIMWIPE after a measured amount of time.

Water-crinkle resistance was determined by holding the ends of an approximately 3.5 by 1.5 inch piece of print between the thumb and forefinger of each hand and rubbing the print against itself under a stream of cold, running tap water. The amount of material removed after fifteen double rubs was noted.

Heat-seal resistance was checked using a THELLER heat sealer after the sample prints had aged overnight. Pieces of the print, about 0.5 by 3 inches in size, were sandwiched between sides of a folded piece of white, uncoated paper, and the sandwich was placed in the heat sealer with the ink side up. Corrugated jaws were used, along with a dwell time of one second at 40 psi pressure. Jaw temperature was varied by 40° increments from 160° to 360° F. Samples were rated by how much blue ink was transferred to the white paper.

Each of the comparative Binders (numbers 2–5) exhibited both poor heat resistance and poor water-crinkle resistance. Furthermore, each of the comparative examples exhibited no chemical resistance to FORMULA 409. In contrast, Binder #1 exhibited both excellent heat resistance and excellent water-crinkle resistance. Moreover, Binder #1 exhibited a 30 second chemical resistance to FORMULA 409. To our knowledge, no water-based vehicle heretofore has exhibited has such resistance. These results clearly indicate that there is a synergistic effect in using both epoxy and β-dicarbonyl monomers together to formulate ink binders.

EXAMPLE 2

For evaluation purposes a series of ink binders with different formulations were made via the procedure taught above for producing Binder #1. In Binder #6, one-half of the styrene contained in Binder #1 was replaced with 29.40 g of acrylonitrile, and the VERSA TL-70 was replaced with 2.64 g of IGEPAL CA-897 (a surfactant commercially available from Rhone-Poulenc, Inc.) and 2.64 g of ABEX EP-120 (a surfactant commercially available from Rhone-Poulenc, Inc). In Binder #7, both the VERSA TL-70 and the acetoacetoxyethyl methacrylate was omitted, while the amount of glycidyl methacrylate was doubled (to 30.00 g). Binder #8 followed the formulation of Binder #6, except that the ABEX EP-120 was replaced with 2.64 g of FIDET OJP-5 (a phosphate surfactant commercially available from Finetex, Inc.). The properties of the different binders are listed in Table II below.

TABLE II

PROPERTIES OF INK BINDERS

| Binder No. | % Solids | pH | Viscosity cP | *$T_g$ °C. | Particle size, nm |
| --- | --- | --- | --- | --- | --- |
| 1 | 38.2 | 9.2 | 6300 | −16 | 115 |
| 6 | 36.2 | 8.5 | 2040 | 35 | 51 |
| 7 | 35.6 | 9.4 | 171 | −16 | 49 |
| 8 | 28.7 | 9.0 | 364 | 0 | 219 |

*$T_g$ = Glass transition temperature in °C.

Each binder was subsequently diluted (via the addition of DI water) to about a 40% solids level and used to produce an ink following the formula and procedure listed below:

45 g of FLEXIVERSE phthalo blue base (commercially available from Sun Chemicals, Inc.), 44 g of ink binder, 2 g of ZINPLEX 15 (a zinc-crosslinker commercially available from Ultra Additives, Inc.), 1 g of TK88-3021 (a silicone-slip agent commercially available from Sun Chemicals, Inc.), 2 g of EKTASOLVE EP (a glycol ether coalescing agent commercially available from Eastman Chemicals, Inc.), and 6 g of DI water (although the amount of water may be varied to obtain the desired viscosity of 25 seconds in a #2 Zahn cup).

In making the inks, the FLEXIVERSE base was first weighed into a tall eight-ounce jar. Vigorous stirring was initiated with the stirrer being a steel shaft holding a three-bladed propeller having a diameter of about 1.5 inches. The other ingredients were then added in the order listed above.

A series of inks were also made via the above procedure wherein the ZINPLEX 15 was omitted.

Prints were made on 48 LBT polyester film with a flexo hand proofer using a 200-line anilox roll. For backing, the film was laid on a piece of hard rubber printing blanket. Prints were dried for five seconds at 80° C. Overdried samples were also made by drying for two minutes at the same temperature.

Resistance of the dried prints to FORMULA 409 (a commercial cleaning formulation containing 2-butoxyethanol available from Clorox, Inc.) was checked by placing a small drop of the chemical on the print surface and wiping it off with a KIMWIPE after a measured amount of time.

Water-crinkle resistance was determined by holding the ends of an approximately 3.5 by 1.5 inch piece of print between the thumb and forefinger of each hand and rubbing the print against itself under a stream of cold, running tap water. The amount of material removed after fifteen double rubs was noted.

Heat-seal resistance was checked using a THELLER heat sealer after the sample prints had aged overnight. Pieces of the print, about 0.5 by 3 inches in size, were sandwiched between sides of a folded piece of white, uncoated paper, and the sandwich was placed in the heat sealer with the ink side up. Corrugated jaws were used, along with a dwell time of one second at 40 psi pressure. Jaw temperature was varied by 40° increments from 160° to 360° F. Samples were rated by how much blue ink was transferred to the white paper. The results of the tests are listed in Table III below.

TABLE III

| | PROPERTIES OF WATER-BASED INKS | | | | | |
|---|---|---|---|---|---|---|
| | Without Zinc | | | With Zinc | | |
| Binder No. | Heat Seal, °F. | Water-Crinkle | 409 Resistance | Heat Seal, °F. | Water-Crinkle | 409 Resistance |
| 1 | 320 | good | 0 | 440 | exc. | 30 sec. |
| 6 | 280 | poor | 0 | 360 | poor | 0 |
| 7 | 260 | poor | 0 | 300 | poor | 0 |
| 8 | 240 | poor | 0 | 200 | poor | 0 |

As shown by the data in Table III, only the zinc-containing water-based ink made from Binder #1 exhibited the desired characteristics. Not only did this ink have excellent heat and water-crinkle resistance, but it also showed chemical resistance to FORMULA 409.

EXAMPLE 3

A chemical-resistant binder may be produced via the following procedure. Into a 1000 ml three-neck round bottom flask is charged 69 g (23.00 parts) of JONCRYL 678 (an acrylic support resin commercially available from S.C. Johnson, Inc.), g of deionized (DI) water, and 16 g of NH$_4$OH (to give the mixture a pH of about 8.5). Subsequently, 5.28 g (1.76 parts) of VERSA TL-70 (a sulfonated polystyrene surfactant commercially available from Alco Chemical, a subsidiary of National Starch, Inc.) is added to the mixture. The mixture is heated to a temperature of 85° C. over a period of 45 minutes; and this temperature is maintained throughout the reaction.

While the first mixture is heating, a 1000 ml beaker is charged with 58.8 g (19.60 parts) of styrene, 112.8 g (37.60 parts) of butyl acrylate, 97.8 g (32.60 parts) of 2-ethylhexyl acrylate, 15.0 g (5.00 parts) of acetoacetoxyethyl methacrylate, and 15.0 g (5.00 parts) of glycidyl acrylate to form a monomer blend.

When the mixture in the flask reached a temperature of 85° C., 10% of the monomer blend is charged into the flask. Simultaneously, a mixture of 1.3 g (0.43 parts) of ammonium persulfate (as an initiator) and 4.0 g (1.30 parts) of DI water is also charged into the flask, and the resulting mixture is stirred and allowed to react for a period of about 20 minutes. After this period the remainder of the monomer blend is pumped into the flask over a 2 hour interval. Likewise, second charge of 1.3 g (0.43 parts) of ammonium persulfate and 4.0 g (1.30 parts) of DI water is also added to the flask after the 20 minute period. A third charge of 1.3 g (0.43 parts) of ammonium persulfate and 4.0 g (1.30 parts) of DI water is added to the flask about 90 minutes after the second charge. After an additional two hours, the latex mixture is allowed to cool and is filtered. Subsequently, the latex mixture is diluted with 278.92 g of DI water to achieve a solids level of about 40%.

To a clean 1000 ml beaker is charged 550.00 g of the latex mixture and 3.65 g piperazine. The resulting mixture is allowed to react with stirring to produce the desired binder formulation. The binder may be utilized to produce a zinc-containing chemical-resistant ink.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A binder composition for use in formulating chemical-resistant aqueous printing inks, wherein said binder composition is prepared by a process comprising reacting in an addition emulsion polymerization reaction:
   (a) 100.0 parts by total weight of the binder composition of a monomer mixture comprising:
      (1) 2.0 to 10.0% by total weight of the monomer mixture of an epoxy-containing monomer,
      (2) 2.0 to 10.0% by total weight of the monomer mixture of acetoacetoxyethyl methacrylate, and
      (3) 80.0 to 96.0% by total weight of the monomer mixture of a member selected from the group consisting of styrene, α-methylstyrene, alkyl acrylates wherein the alkyl group contains from 1 to 18 carbon atoms, methacrylates wherein the alkyl group contains from 1 to 18 carbon atoms, and combinations thereof;
   (b) 10.0 to 30.0 parts by total weight of the binder composition of a water-soluble acrylic support resin having a number average molecular weight of about 3,000 to about 10,000 and an acid number of about 160 to about 240; and
   (c) 0.5 to 4.0 parts by total weight of the binder composition of a sulfonated polystyrene salt of the structure

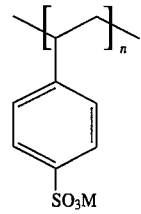

where M is a member selected from the group consisting of monovalent metal ions, ammonium ions, and substituted ammonium ions, to produce a latex; then add to the latex
   (d) 0.5 to 5.0 parts by total weight of the binder composition of an amine selected from the group consisting of amines containing at least 1 primary amine group and at least 1 secondary amine group, amines containing at least 2 primary amine groups, amines containing at least 2 secondary amine groups, and combinations thereof; thereby crosslinking the epoxy groups of said epoxy-containing monomer to produce said binder composition.

2. The binder composition of claim 1 wherein the epoxy-containing monomer is selected from the group consisting of glycidyl acrylate, glycidyl methacrylate, and combinations thereof.

3. The binder composition of claim 1 wherein the amine is selected from the group consisting of aminoethylpiperazine, piperazine, and combinations thereof.

4. A water-based zinc-containing ink comprising the binder composition of claim 1 and a pigment dispersion.

* * * * *

UNITED STATES PATENT AND TRADEMARK OFFICE
CERTIFICATE OF CORRECTION

PATENT NO. : 5,498,661
DATED : March 12, 1996
INVENTOR(S) : G. Frederick Hutter

It is certified that error appears in the above-indentified patent and that said Letters Patent is hereby corrected as shown below:

On the title page, 2nd column, under Attorney, Agent or Firm, after Terry, delete "P." and subsitute therefor --B.--.

In column 7, line 26, after Johnson, Inc.), insert --300--.

Signed and Sealed this

Fourth Day of June, 1996

Attest:

BRUCE LEHMAN

*Attesting Officer*  *Commissioner of Patents and Trademarks*